US011190824B2

(12) United States Patent
Durbha et al.

(10) Patent No.: US 11,190,824 B2
(45) Date of Patent: *Nov. 30, 2021

(54) ZERO SIGN-ON AUTHENTICATION

(71) Applicant: CABLE TELEVISION LABORATORIES, INC., Louisville, CO (US)

(72) Inventors: Seetharama R. Durbha, Louisville, CO (US); Oscar Marcia, Broomfield, CO (US); Stuart Hoggan, Longmont, CO (US); Simon Krauss, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,688

(22) Filed: Apr. 6, 2020

(65) Prior Publication Data
US 2020/0236412 A1 Jul. 23, 2020

Related U.S. Application Data

(63) Continuation of application No. 16/170,690, filed on Oct. 25, 2018, now Pat. No. 10,616,628, which is a
(Continued)

(51) Int. Cl.
*G06F 15/173* (2006.01)
*H04N 21/258* (2011.01)
(Continued)

(52) U.S. Cl.
CPC ....... *H04N 21/25816* (2013.01); *G06F 21/10* (2013.01); *H04L 47/70* (2013.01);
(Continued)

(58) Field of Classification Search
CPC ....... H04L 61/256; H04L 63/08; H04L 47/70; H04L 63/10; H04L 63/107;
(Continued)

(56) References Cited

U.S. PATENT DOCUMENTS 7,788,700 B1 8/2010 Feezel et al.
8,281,379 B2 10/2012 Noë
(Continued)

OTHER PUBLICATIONS

Almenarez, Florina, et al. "TrustAC: Trust-based access control for pervasive devices." Security in Pervasive Computing. Springer Berlin Heidelberg, 2005, pp. 225-238.
(Continued)

*Primary Examiner* — Duyen M Doan
(74) *Attorney, Agent, or Firm* — David Daniel Smith; Cable Television Laboratories, Inc.

(57) ABSTRACT

An authenticating system and process for authenticating user devices to a access a service where access to certain portions of the service may be limited according to a access point or other device used by a user device to facilitate interfacing a user with the service. The authentication may be achieved without directly assessing a trustworthiness of the user devices, and optionally, without requiring a user thereof to complete a sign-on operation.

20 Claims, 4 Drawing Sheets

Related U.S. Application Data continuation of application No. 15/465,120, filed on Mar. 21, 2017, now Pat. No. 10,116,980, which is a continuation of application No. 14/315,949, filed on Jun. 26, 2014, now Pat. No. 9,602,425, which is a continuation-in-part of application No. 12/650,664, filed on Dec. 31, 2009, now Pat. No. 8,793,769.

(51) Int. Cl.
  *H04L 12/911* (2013.01)
  *H04L 29/06* (2006.01)
  *G06F 21/10* (2013.01)
  *H04L 29/12* (2006.01)

(52) U.S. Cl.
  CPC ............ *H04L 61/256* (2013.01); *H04L 63/08* (2013.01); *H04L 63/10* (2013.01); *H04L 63/107* (2013.01); *H04L 63/1433* (2013.01); *H04L 65/1023* (2013.01); *H04N 21/25841* (2013.01); *G06F 2221/0706* (2013.01)

(58) Field of Classification Search
  CPC ............ H04L 63/1433; H04L 65/1023; H04N 21/25816; H04N 21/25841; G06F 21/10
  USPC .................. 709/203, 225; 380/200; 726/12
  See application file for complete search history.

(56) References Cited

U.S. PATENT DOCUMENTS

| | | | |
|---|---|---|---|
| 8,627,438 B1 * | 1/2014 | Bhimanaik | G06F 21/36 726/9 |
| 8,850,501 B2 | 9/2014 | Petersson et al. | |
| 9,742,768 B2 * | 8/2017 | Cholas | H04L 67/16 |
| 2004/0236965 A1 | 11/2004 | Krohn | |
| 2005/0166053 A1 | 7/2005 | Cui et al. | |
| 2006/0005032 A1 | 1/2006 | Cain et al. | |
| 2006/0020782 A1 | 1/2006 | Kakii | |
| 2006/0031510 A1 | 2/2006 | Beck et al. | |
| 2006/0059158 A1 | 3/2006 | Ussery et al. | |
| 2006/0156392 A1 | 7/2006 | Baugher | |
| 2006/0230278 A1 | 10/2006 | Morris | |
| 2007/0073937 A1 * | 3/2007 | Feinberg | H04N 1/00151 710/62 |
| 2007/0083915 A1 | 4/2007 | Janakiraman et al. | |
| 2007/0136295 A1 | 6/2007 | Gorodyansky et al. | |
| 2007/0233540 A1 | 10/2007 | Sirota | |
| 2008/0098225 A1 | 4/2008 | Baysinger | |
| 2008/0209464 A1 | 8/2008 | Wright-Riley | |
| 2008/0222711 A1 * | 9/2008 | Michaelis | H04W 12/06 726/7 |
| 2009/0144815 A1 | 6/2009 | Vrielink et al. | |
| 2009/0254976 A1 | 10/2009 | Huotari et al. | |
| 2010/0042735 A1 | 2/2010 | Blinn et al. | |
| 2010/0115132 A1 | 5/2010 | Hirata et al. | |
| 2010/0205261 A1 | 8/2010 | Michel | |
| 2010/0275251 A1 | 10/2010 | Gross et al. | |
| 2010/0287582 A1 | 11/2010 | Barnett | |
| 2010/0306394 A1 | 12/2010 | Brown et al. | |
| 2010/0306823 A1 | 12/2010 | Durand | |
| 2010/0312826 A1 | 12/2010 | Sarosi et al. | |
| 2011/0173348 A1 | 7/2011 | Poel | |
| 2012/0054856 A1 * | 3/2012 | Johansson | H04N 21/4516 726/19 |
| 2015/0215424 A1 | 7/2015 | Chun et al. | |

OTHER PUBLICATIONS

Subramanian, S.; Wang, P.; Durairaj, R.; RAsimas, J.; Travostino, F.; Lavian, T.; Doan Hoang, "Practical active network services within content-aware gateways," DARPA Active Networks Conference and Exposition, 2002, Proceedings, pp. 344, 354.

* cited by examiner

ZERO SIGN-ON AUTHENTICATION

CROSS-REFERENCE TO RELATED APPLICATIONS

This application is a continuation of U.S. application Ser. No. 16/170,690, filed Oct. 25, 2018, which application is a continuation of U.S. application Ser. No. 15/465,120 filed Mar. 21, 2017, now U.S. Pat. No. 10,116,980, which in turn is a continuation of U.S. application Ser. No. 14/315,949 filed Jun. 26, 2014, now U.S. Pat. No. 9,602,425, which in turn is a continuation-in-part of U.S. patent Ser. No. 12/650,664 filed Dec. 31, 2009, now U.S. Pat. No. 8,793,769, the benefits and disclosures of which are incorporated in their entireties by reference herein.

TECHNICAL FIELD

The present invention relates to facilitating user access to media services without requiring a user to sign-on or enter a password as part of an authentication process required before permitting access to the media services.

BACKGROUND

Within the satellite, broadcast, and cable television industries, and other media service based industries, more and more media services are being made available to users through different types of user devices. Users within the same home, for example, may be able to use multiple devices (such as mobile phones, laptop computers, media terminal adapter (MTA), etc.) to access media services that once were only available through a single type of device, such as television for watching video. While the ability of these different types of user devices to access the media services may be convenient and provide greater access to subscribers, the corresponding increase in the number of device based access points increases the security demands on service providers. Instead of simply securing a single access point within the home that has limited communication capabilities and that operates according to a more secure, and in some cases, proprietary operating systems, e.g., a television tuner or settop box (STB), the service providers are now faced with the challenge of securing less secure devices that operate according to non-proprietary operating systems and that have multiple communications mediums.

Service providers have implemented sign-on based authentication processes in effort to address the security concerns associated with the increased number of user devices. Sign-on based authentication processes generally rely on the assistance of a security application or other feature operating on the user device to identify itself to the service provider and the service provider relying on this identification as part of an authentication process evaluation. With the security applications operating at the user device, and not on a server or other upstream device, the service providers are unable to relieve some of the related security processing burdens from the user devices. One sign-on based authentication system relies on certificates being assigned to each of the user devices and transmission of the certificates to the service provider each time one of the user devices attempts to access media services. Another sign-on process based authentication system relies on a user to manually sign-on to a website or other portal with a username and password prior to being granted media access (in some cases, cookies kept on the user device may be used to automatically sign-on the user for a specific amount of time (e.g., two weeks) or as long as the cookie is not deleted).

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
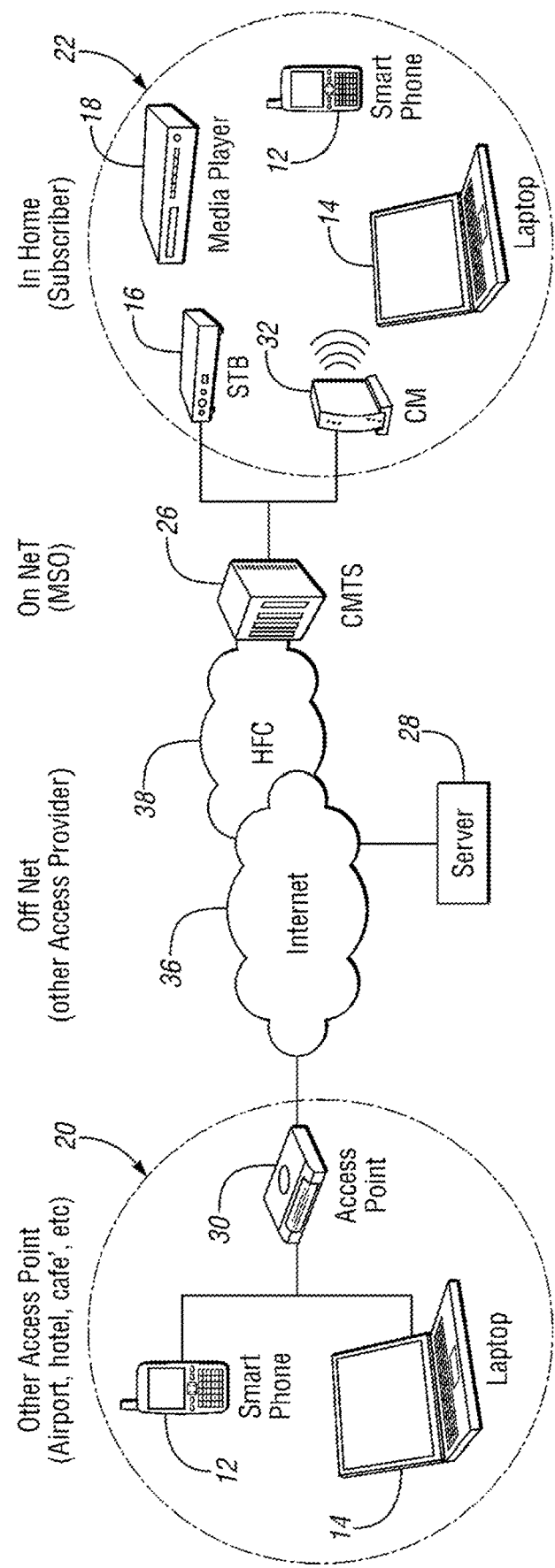
FIG. 1 illustrates a system configured to facilitate user access to media services in accordance with the present invention.

FIG. 1 illustrates a system 10 configured to facilitate user access to media services without requiring a user to sign-on or enter a password as part of an authentication process required before permitting access to the media services in accordance with one non-limiting aspect of the present invention. The system 10 supports user access to any type of suitable media service from a number of user devices, which for exemplary purposes are shown to include a mobile phone 12, laptop computer 14, settop box (STB) 16, and media player 18. Some of the user devices 12, 14, 16, 18, such as the mobile phone 12 and laptop 14, may be mobile type devices in that they may be configured to support access to media services from different locations, which are shown for exemplary purposes to be a wireless access point 20 and a home network 22.

The user devices 12, 14, 16, 18 may be configured to support access to any number of media services. The present invention, while predominately described with respect to supporting access to media services offered by satellite, broadcast, and cable television service providers; high speed data service providers; and telephony service providers, fully contemplates its use with any type of media service that relies on signal communications from a service provider, and optionally, where the service provider is able to communicate the signals to different locations 20, 22 and different types of user devices 12, 14, 16, 18. The exemplary illustration of providing television services is set forth to demonstrate one useful aspect of the present invention in so far as supporting IP streaming of television programs and broadcasts to users and one or more of their devices 12, 14, 16, 18 regardless of the location 20, 22 of the user device 12, 14, 16, 18 and the networking medium used to facilitate communication of the related signaling.

The streaming of the television signals may be supported with a cable modem termination station (CMTS) 26 in the case of a cable based communication system configuration or some other analogous devices in the case of satellite, highs speed data, and telephony based service provider system configurations. The service provider may include a server 28, headend unit, or other device to support and source television programs, previously recorded video (VOD, PVR, etc.), and other media content (video games, webpages, etc.) to the CMTS 26 for subsequent packaging and transmission to one or more gateways 30, 32 included at each location. The gateways 30, 32, for example, may be cable modems or other network interfaces configured to support message communications between the CMTS 26 and the local user devices 12, 14, 16, 18.

Different networks 36, 38 may be used to support communications with different locations 20, 22 and the gateways 30, 32 may be correspondingly configured to support the interfaced network 36, 38, such as but not necessary limited to the manner described in U.S. patent application Ser. Nos. 14/181,640, 14/181,641 and 14/181,643, the disclosures of which are hereby incorporated by reference in their entireties. The first gateway 30 is shown as an access point configured to support communications carried over the internet 36 and the second gateway 32 is shown to be a cable modem configured to support communication over a hybrid fibre-coaxial (HFC) network 38. The gateways 30, 32 are also shown for exemplary purposes to facilitate wireless communications with one or more user devices 12, 14, 16, 18 in communication therewith. The wireless communications between the gateways 30, 32 and the user devices 12, 14, 16, 18 may take place according to any protocol or communication standard, such as but not limited to IP. In this manner, IP streaming of television programs may be achieved through wireline communication of television programs from the CMTS 26 to one or more gateways 30, 32 that then wirelessly communicate the television programs to one or more of the user devices 12, 14, 16, 18.

To limit the proliferation of the television programs and other media services to non-authenticated user devices 12, 14, 16, 18, one non-limiting aspect of the present invention contemplates implementing a zero sign-on authentication process. The zero sign-on authentication process may be characterized as allowing user access to any media service previously authorized to be accessed by an associated user depending on a level of trust associated with the gateways 30, 32 being used by user device 12, 14, 16, 18 at time of access. In other words, one non-limiting aspect of the present invention contemplates a security arrangement where access to subscribers services, and in some case the degree of access permitted, is predicated on a level of trust the service provider has of the accessing entity at the time of receiving a media request of the media service.

The security arrangement of the present invention may include the authentication processing limiting the processing demands on the user devices 12, 14, 16, 18 by determining the level of trust without specifically relying on the user devices 12, 14, 16, 18. The user devices 12, 14, 16, 18, for example, may not be required to provide certificates or to support a sign-on or other operation where a user is required to input a password or other identifying information before being granted access to the media service, i.e., the user is not required to enter a user name and password into a website or other portal each time the media service is requested and/or accessed. The security arrangement of the present invention may also limit the security processing demands of the service provider by not requiring the service provider to track security certificates and to create security related data entries for each of the user devices 12, 14, 16, 18. The system 10 may be configured to meet these advantages with the contemplated zero sign-on authentication process in that it may eliminate the processing demands on the user devices 12, 14, 16, 18 by relying on processing performed by the gateways 30, 32 and it may eliminate tracking of each user device 12, 14, 16, 18 by instead only tracking the gateways 30, 32.

Figure 2:
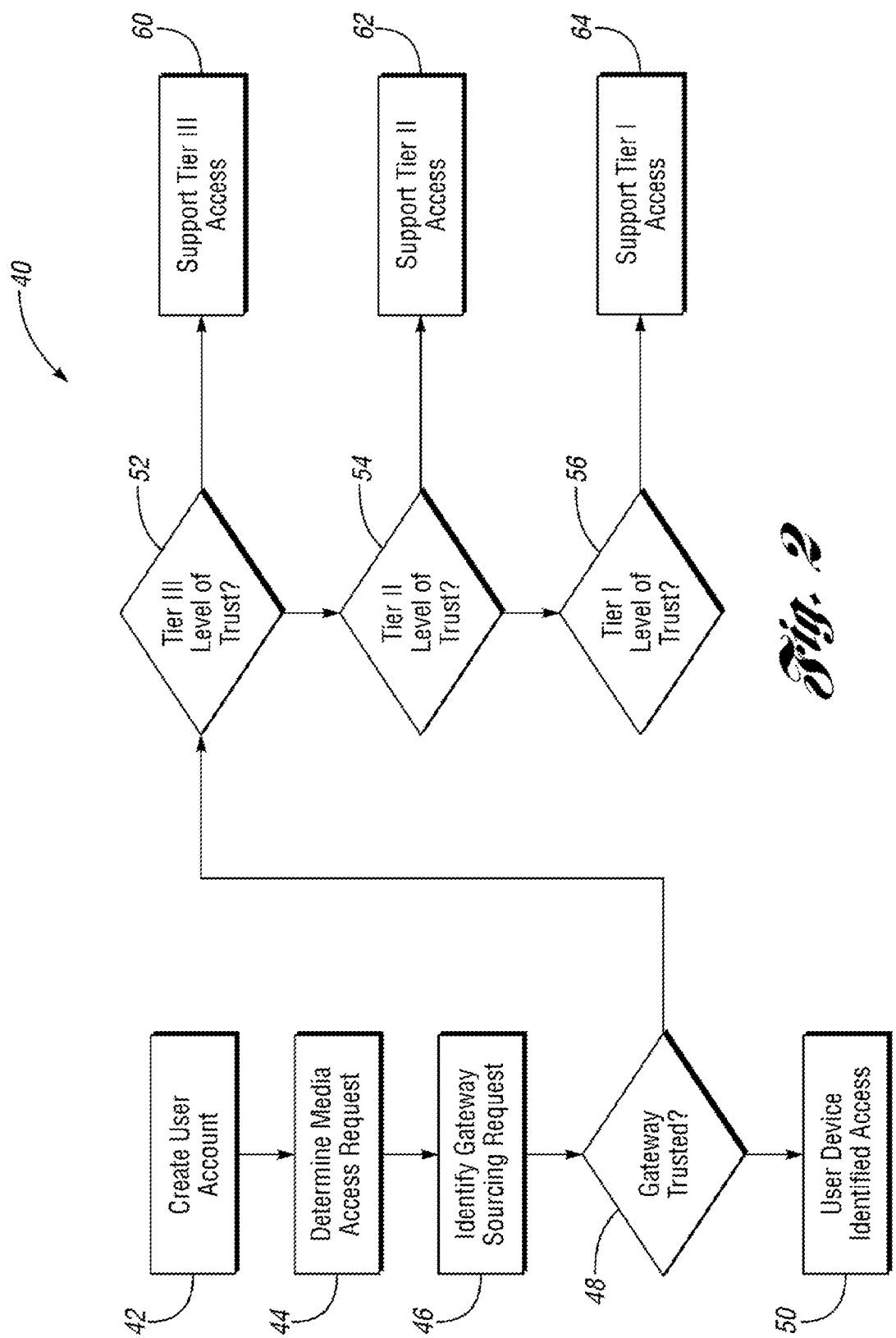
FIGS. 2-4 illustrates flowcharts for facilitating zero sign-on authentication in accordance with the present invention.

FIG. 2 illustrates a flowchart 40 of a method for facilitating zero sign-on authentication in accordance with one non-limiting aspect of the present invention. Block 42 relates creating a user account for a subscriber or other purchaser of media services from the service provider. The user account may be used to determine entitlements and other information regarding media service authorized for access by a particular user. The entitlements, for example, may be purchased according to tiers of service, which may vary depending on the particular services being offered. With respect to television based services, for example, a first tier of service may relate to purchasing access to non-premium television channels (e.g., broadcasted television channels and other channels that me be included as part of a basic package); a second tier of service may relate to purchasing access to the non-premium channels and premium channels (e.g., movie channels, gaming subscriptions, etc.); a third tie of service my relate to purchasing access to the non-premium and premium channels and other services, such as but not limited to VOD, PVR (personal video recording stored remotely for the user by the service provider), and/or other services when secure access may be more critical.

The account may be created by a user phoning the service provider to request service and/or by making a similar request through a webpage or other medium. One non-limiting aspect of the present invention particularly contemplates a situation in which a user purchases a gateway or other consumer type device from a source other than the service provider and thereafter requests access to the service provider's service through the device and/or the service provider otherwise providing the gateway without previously securing the assignment and association of its MAC address with the user. As part of the process of creating the user account, the method may include particularly identifying the user with the purchased gateway according to a MAC address of the gateway and addressing used to communication therewith. In the case of the gateway being a cable modem and a cable MSO (service provider) providing the video services, the identification may include associating the MAC address with a domain name of the CMTS or other node used in initially supporting communications with the gateway at the time of creating the user account.

Block 44 relates to the service provider or an authentication entity, such as a server or other entity used by multiple service providers having capabilities to communicate with the user devices, determining issuance of a media access request from one of the user devices. The media access request may take the form of a DNS request, for example, when the user device calls up a webpage offering services of the service provider or otherwise navigates to some sort of menu or graphical user interface, such as an electronic programming guide (EPG), in a manner that results in the user device requesting access to media services. In the case of streaming video, the request may arise from the user device accessing a homepage of the media service provider and without the user clicking on a link or otherwise being forced to take any action within the homepage, i.e., the media access request contemplated by the present invention may be automatically determined as part of the DNS process used to display the service provider's homepage on the user device and without the user having to manual issue the media access request.

Block 46 relates to identifying a gateway used to source or otherwise facilitate communication of the media access request from the user device to the service provider. The determination may be based on information traveling with the media access request as it passes through the gateway and onto the network of the service provider. The gateway, for example, may be identified according to its MAC address or as a function of other identifying characteristics that may be suitable for cross-reference with information including within a database used to store the information associated with the user accounts. As part of this identification process, a level of trust may be determined for the identified gateway. The level of trust may be a 'trust score' or other ranking of the gateway with respect to a likelihood that the gateway is the gateway originally associated with the MAC address.

In some cases, a gateway used to transmit messages may be cloned such that the message passing through it are assigned the MAC address of another gateway instead of the gateway's own MAC address. One aspect of the security contemplated by the present invention may include assessing the likelihood that a gateway or other element sourcing the media access request is clone of another device, i.e., the trustworthiness of the gateway being who the gateway says it is. As noted below, the authentication process used to permit access to the service provider's media service may be based on an identification of the gateway and not an identification of the user device. Since this type of identification methodology is not based on the user device, one may only need to clone the gateway of another to freely access media service paid for by someone else. One non-limiting aspect of the present invention contemplates counteracting this concern by making an inquiry into the authenticity of the gateway and ranking that inquiry according to a level of trust.

The metrics and information collected to determine the level of trust may vary according to the configuration of the gateway and the means by which it interfaces signals with the user device. A cable modem, for example, is typically a stationary device located with a home network or other fixed network. It is unlikely that the cable modem will frequently move from one location to another, and a node, CMTS, or other similar fixed device used to communicate with the cable modem is similarly unlikely to change locations, allowing for an approximate physical location of the gateway to be determined from the domain name of the CMTS with which it communicates to be one factor reflective of the level of trust. If the MAC address and domain name traveling with the media access request match with a MAC and address and domain name combination included with the user account database, then that may be one indication that the gateway is trustworthy.

While a cloned gateway and a non-cloned gateway cannot simultaneously operate effectively on the same node, they can operate effectively on the same node when the other is inactive. As such, simply relying on a match of the MAC address and domain name may not be a sufficient representation of the trustworthiness of the gateway. An additional factor of trustworthiness may be whether the service provider is able to support SNMP communications with the gateway. The ability to support SNMP communication means the service provider is able to 'ping' the gateway through known, and trusted, addressing techniques, i.e., it may be unlikely of an SNMP 'ping' issued to a non-cloned gateway to reach a cloned gateway. Another additional factor of trustworthiness may be whether the gateway is actively supporting Baseline Privacy Interface Plus (BPI+) or some other certification based privacy system by which the service provider would assign a certificate to each gateway that would be difficult for a cloned device to copy.

Once the information reflective of the trustworthiness of the gateway is collected, such as through an electronic query, an analysis of the information may be used to determine whether any of the factors point to some level of trustworthiness. If none or so few of the factors indicate a sufficient level of trust, then the gateway may be determined to be untrustworthy and Block 50 is reached. Even though the gateway may be untrustworthy, the subscribers may still be entitled to access media services at non-trusted locations. As such, Block 50 allows for a secondary authentication process to occur where the user device making the media access request is identified, with a login process or an automatic certificate exchange process (e.g., the user account can specify and assign certificates to MAC address and other specifically identified user devices). Properly identified user devices can then be used to access purchased services through any gateway and not just the one or more gateways associated with the corresponding user's user account.

In the event Block 48 determines the user device to be associated with a gateway having some level of trust, there may be no need to specifically identify the user device through the sign-on process of Block 50. The level of trust determined for the gateway may instead be used to assess whether it meets the highest levels of trust, referred to a Tier III, in Block 52. A Tier III level of trust may be determined if the gateway positively passes each of the three tests described above (e.g., matching MAC address and domain name, SNMP communication, and BPI+). Thereafter, a Tier II or Tier I level of trust may be determined in Blocks 54, 56 depending respectively on whether the gateway passes at least two of the tests and at least one of the tests. Depending on the corresponding level of trust, a level of access allowed to the access device is determined in Blocks 60, 62, 64 to be one of the first, second, and third tiers of services noted above. Once the tier of service is determined, an automatic authentication or other process may take place between the service provider and user device to facilitate delivery of signaling, firmware, etc. needed by the user point to access to the desired media service (e.g., message exchange may take place to instigate streaming of a desired television channel to the user device). This authentication may take place in a manner that is transparent to the user and without requiring the user to input any information into the user device.

Figure 3:
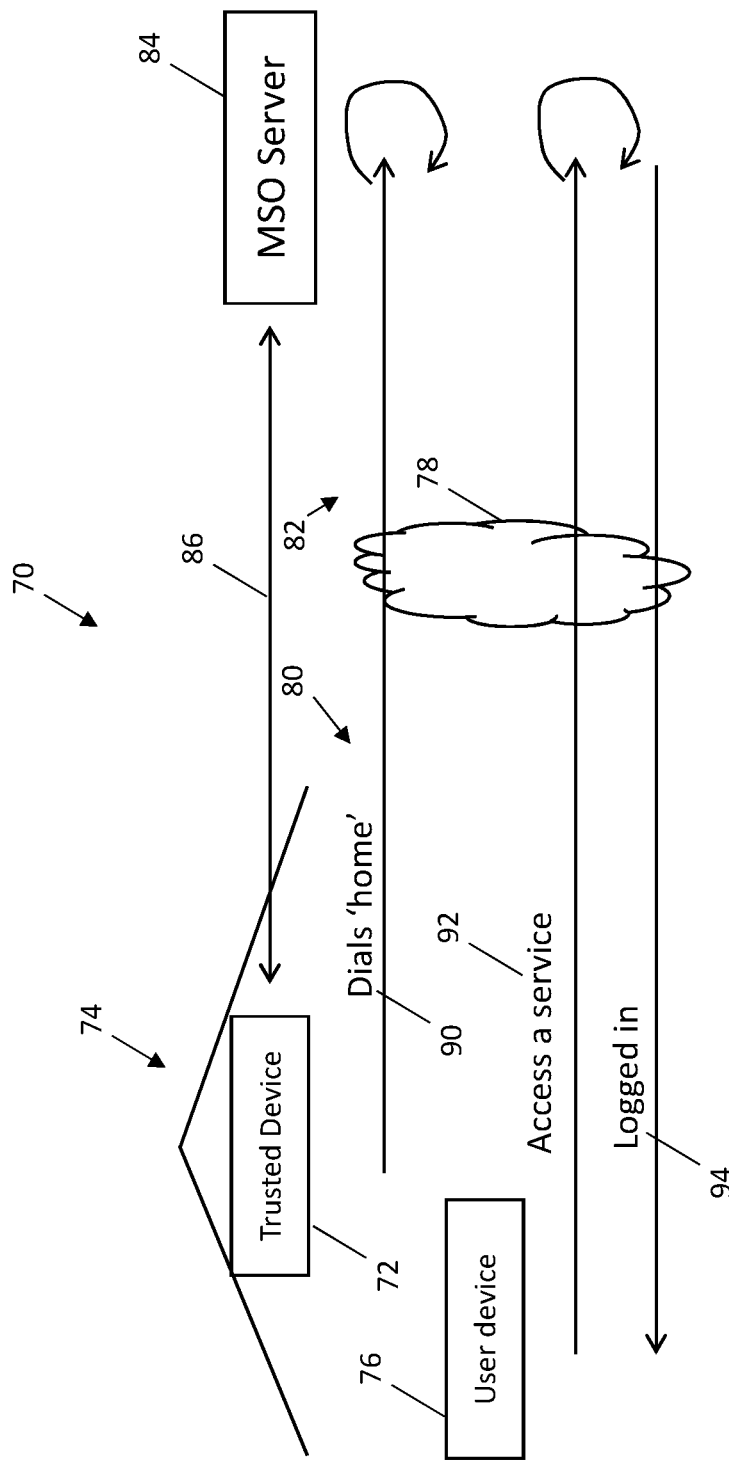

FIG. 3 illustrates a flowchart 70 of a method for facilitating zero sign-on authentication in accordance with one non-limiting aspect of the present invention. The method may be embodied in a computer-readable medium having a plurality of instructions operable with a processor to facilitate controlling one or more devices to facilitate the operations contemplated herein. The flowchart 70 illustrates an exemplary configuration where a device 72 within a subscriber home 74, such as but not necessary limited to an STB, is a trusted device and additional devices within the home are not so trusted, such as but not necessary limited to a user device 76, e.g., a laptop computer, and a gateway 78, cable modem, or router facilitating message exchange between an inside network 80 and an outside network 82. The trustworthiness of the trusted device 72 relative to the user device 76 or other devices 78 in the home 74 may be determined from the point of view of an MSO or other service provider. The flowchart illustrates an exemplary configuration where a server 84 of the MSO may be configured to provide media access to the user device 76 utilizing signaling communicated through the gateway 78, such as by enabling the laptop computer 76 to stream a television program or other media over the Internet 82 in the manner described in U.S. patent application Ser. No. 13/922,386, entitled Administration of Web Page, the disclosure of which is hereby Incorporated by reference in its entirety, as well as signaling through a separate interface on the trusted device.

The MSO may be a service provider independent of or otherwise disassociated with a service provider of the gateway 78 or other device within the home 74 providing Internet access. Such a scenario may occur when the MSO provides television, phone or other services separate from high-speed data or Internet services associated with the gateway provider. In the case of the trusted device 74 being a STB, the MSO may be a television service provider having a cable or other private communication medium operating independently of the gateway 78 to deliver services to the STB 72 and/or additional trusted devices within the home 74. The television signaling may optionally be communicated over a medium 86 distinct from that facilitated with the gateway 78, e.g., the television signaling may be transmitted through a network distinct from the network 82 providing Internet access via the gateway 78 (the television network 86 may be a coaxial cable and the gateway 78 may be configured to provide Internet access through an optical cable). The trusted device 72 may be provided by the MSO or installed by a technician of the MSO and/or off-the-shelf products purchased and provided credentials, keys, etc. from the MSO to access its services. The trusted device 72 may be considered to be trusted from the point of view of the MSO if loaded with a proper credential or otherwise within an appropriate domain.

One non-limiting aspect of the present invention contemplates the trusted device 72 being loaded with or downloading a dial home application. The dial home application may be configured to facilitate identifying a location or other information for the trusted device 72 within the home 74. The information may be transmitted in a message 90 delivered through the private network 86 or interface with the MSO and/or through an IP-delivered message transmitted via the gateway 78 over the Internet 82. The dial home message 90 may be utilized to provide identifying information of the trusted device 72 to the MSO server 84, such as by enabling the trusted device 72 to provide a credential or other authentication entitlement to MSO for verification. The MSO server 84 may authenticate the trusted device 72 as a function of an included certificate or other information in order to derive account information, a device ID and/or an IP address associated therewith. The IP address may be determined by the trusted device 72 listening to an address assigned to it on the inside network 80 and/or from addressing applied by the gateway 78 when transmitting over the Internet 82. The gateway 78, for example, may be configured as a network address translator (NAT) configured to facilitate exchanging signals between inside and outside networks 80, 82 such as by facilitating translation of IP addresses used on the inside network 80 and the outside network 82.

The gateway 78 may be configured to assign the devices 72, 76 within the home 74 unique inside addresses while utilizing the same outside addresses for the devices 72, 76 when communicating over the outside network 82, such as in the manner described in U.S. patent application Ser. No. 14/270,222, entitled Internet Protocol (IP) Address Translation, the disclosure of which is hereby Incorporated by reference in its entirety. The address assigned by the gateway 78 or otherwise utilized to facilitate communications with the MSO server 84 over the outside network 82 may be utilized for purposes of determining a location of the trusted device 72 and/or its relation to other devices 76 sharing the same IP address. One non-limiting aspect of the present invention contemplates utilizing IP addresses to obtain location information for the subscriber of the trusted device 72, such as by relating IP addresses to known subnets or domains, and/or utilizing IP addresses to generate relationships to other devices 76 in proximity thereto, e.g., it may be assumed that an untrusted device 76 or other device is in proximity to the trusted device 72 when that device 76 includes an IP address matching with the IP address identified for the trusted device 72 and/or when IP addresses are sufficiently similar to indicate a common presence or proximity.

Because the MSO server 84 has provided the trusted device 72 with a credential or has otherwise establish a sufficient level of trust with the trusted device 72, the information collected from the dial home application may be beneficial in facilitating authorization to other services provided by the MSO. One non-limiting aspect of the present invention contemplates authenticating the untrusted device 76 for access to services available to the trusted device 72 if the untrusted device 76 is determined to be in proximity to the trusted device 72 or connected to the same inside or home network 80, 82 as the trusted device 72. The trust established for the trusted device 72 and its attendant authorizations, entitlements, subscription services, etc. may be conferred to the untrusted device 76 in order to allow the untrusted device 76 to access the services associated with the subscriber or user of the trusted device 72, which may be beneficial in providing an improved customer experience by allowing subscribers to access their entitled services on additional devices and/or through other communication mediums (e.g., instead of relying upon a QAM channel or other cable television signaling, the user may be able to stream or download their entitled media over the Internet). One non-limiting aspect of the present invention contemplates conferring authorizations to the untrusted device 76 using zero sign-on, such as in the manner described above where the user device is permitted access to services without having to enter in a username and password combination and/or without having to otherwise identify themselves to the MSO server 84.

An access service request or other media request 92 may be transmitted from the user device 76 through the gateway 78 to the MSO server 84 in order to request access to media services associated with the trusted device 72. The media access request 92 may be generated in response to user interaction with a webpage or other GUI hosted by the MSO server 84. The media access request may include information identifying the user device 76, such as but not necessary limited to an IP address assigned to the user device 76 for use over the inside network 80 and/or for use over the outside network 82. The MSO server 84 may process information included within the media access request 92 to identify a trusted device 72 in proximity thereto. The proximity analysis may be performed by identifying trusted devices having a matching IP address or substantially similar IP address as that identified within the media access request 92 and/or through other means sufficient to establishing proximity to a common location (e.g., a network address translation table or other mapping means employed by the gateway 78 may be utilized to facilitate identifying inside addresses associated with the same inside network). Once one or more trusted devices 72 are determined to be in proximity to the user device 76, the entitlements, credentials or other service level indicators for those devices 72 may be reviewed to determine their sufficiency for enabling access to the media requested in the media access request 92. In this manner, a level of trust may be established for the trusted device 72 or other secondary device within the same location as the untrusted device 76 and utilized to determine whether access should be granted to the requested media service.

A login or zero sign-on operation 94 may be performed for the user device in the event the level of trust is sufficient. The level of trust may be determined to be sufficient if the credential provided by the dial home application for the related trusted device 72 is sufficient to access the requested media service. The level of trust may also be determined to be sufficient depending on a tier or scope of content being accessed. The MSO may allow access to certain services as long as the untrusted device 76 is close to a trusted device 72 even if a credential or other piece of authentication has not provided from the trusted device 76, e.g., the user device 76 may be enabled access to one tier of service in the absence of a credential being associated with the trusted device 72 and enabled access to a greater or enhanced tier of service when a suitable credential is associated with the trusted device 72. In the event the level of trust is insufficient, the logon operation 94 may be performed in a sign-on (SO) manner where a user of the user device is requested to input a username and password combination or other identifying information needed to assess whether the user is entitled to access the requested media service. The user device 76 then may be provided access to the requested media utilizing signaling transmitted through the gateway 78, e.g., a using IP signaling streamed over the Internet, thereby enabling access to media services through a network or mechanism 82 other than the medium 86 used by the trusted device 72 to access the same services.

Figure 4:
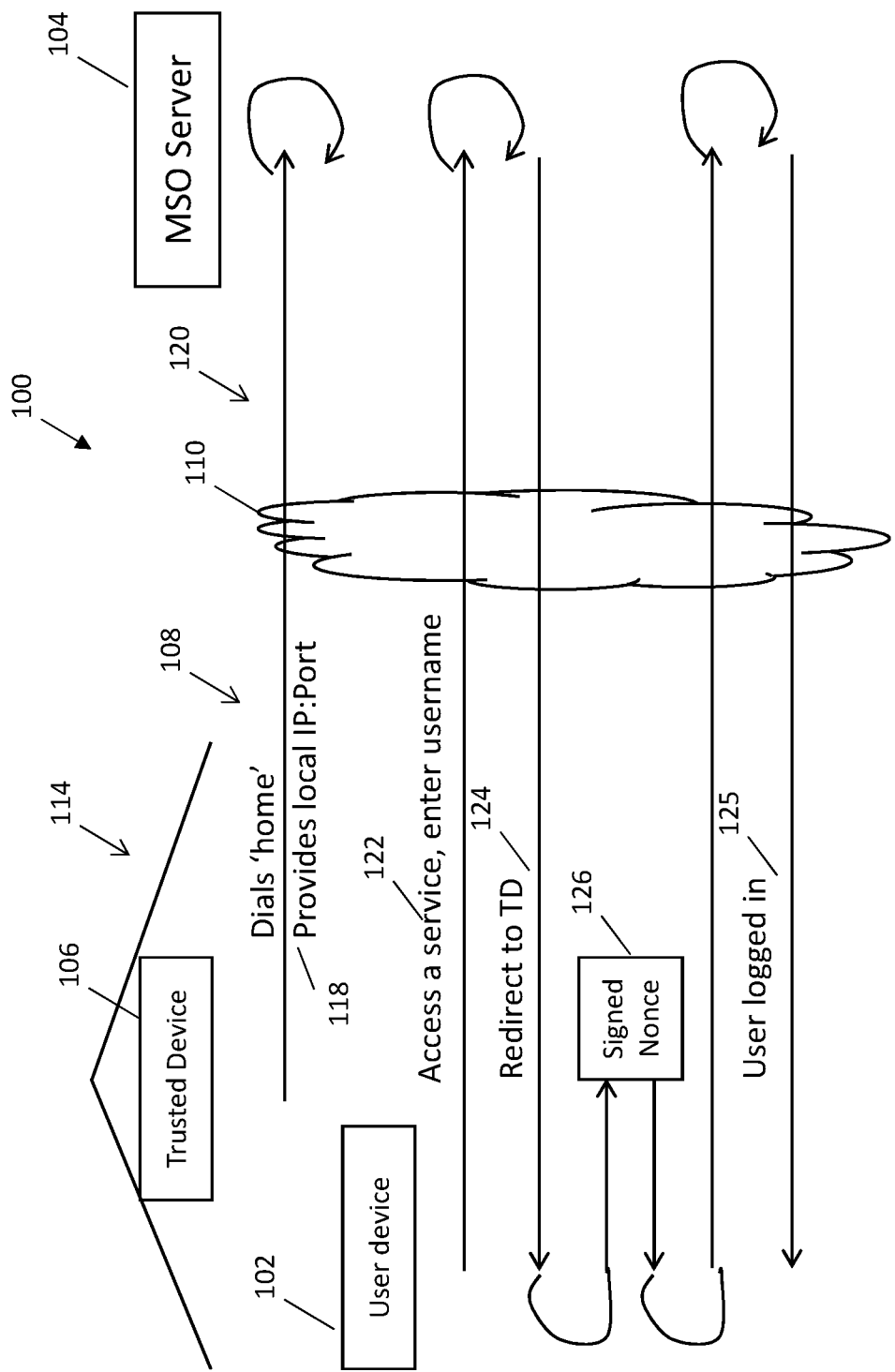

FIG. 4 illustrates a flowchart 100 of a method for facilitating zero sign-on authentication in accordance with one non-limiting aspect of the present invention. The flowchart 100 describes facilitating zero sign-on when an untrusted device 102 requests access to media services from an MSO server 104 while a trusted device 106 is at the same location or connected to the same home network 108. The trusted device 106 is described as being distinct from an untrusted gateway 110 or other unaffiliated device utilized by the untrusted device 102 to request access to the media services. This exemplary presentation demonstrates one capability of the present invention to facilitate zero sign-on authentication to services through the untrusted device 102 when the access point 110 or other means utilized by that device 102 to request the services is similarly untrusted as long as the MSO is able to identify a trusted device 106 in proximity/connected thereto. The trusted device 106 may include a dial home application similar to that described above to facilitate identifying its presence within a home 114 to the MSO server 104. The dial home application may transmit a message 118 identifying an IP address or other information uniquely identifying the untrusted device 102 within the inside network 108. The message may identify the IP address and a port on which the trusted device 106 listens to receive communications over the inside network 108.

The dial home application may provide a credential or other information to the MSO server dial 104 for the purposes of authenticating itself. Optionally, instead of providing credential or other electronic data, the dial home application may request the user for a username and password combination. The MSO server 104 and generate and may perform an authentication of the provided credentials for the purposes of generating an association with the IP address and port included therewith. The IP address and port may correspond with the inside address and port address utilized by the trusted device 106 on the inside network 108 as opposed to an outside IP address utilized by the gateway 110 over an outside network 120. The IP address and port may be assigned by the gateway 110 and/or discoverable by the dial home application. The untrusted device 102 may issue a media access request 122 following authentication of the trusted device 106. The media access request 122 may include identifying information of the user associated therewith, such as a username, to facilitate cross-referencing the request with an associations generated as a function of information provided from the dial home application. Additional information besides the username may be used to facilitate the association, such as but not necessary limited to utilizing an IP address assigned to the untrusted device 102, e.g., association may be based on a matching or common IP address, such as the outside IP address utilized by the gateway 110 to facilitate network address translation for both of the trusted and untrusted devices 102, 106.

The MSO server 104 may perform a redirect 124 in response to receiving the media access request 122 from the untrusted device 102. The redirect operation 124 may request the untrusted device 102 to request a signed nonce 126 from the trusted device 106. The request 124 may specify the IP address and port or other addressing information provided from the dial home application to facilitate communications with the trusted device 106 over the inside network 108. The signed nonce 126 may be a dataset signed by the trusted device 106 according to a key or other mechanism provided by the dial home application and/or the MSO server 104. The redirect 124 may instruct the untrusted device 102 to provide the signed nonce to the MSO server 104 for verification. The MSO server 104 may assess the signature to determine whether the trusted device 106 actually or was sufficiently likely to have signed the received nonce 126. Optionally, the nonce verification may include assessing a timestamp or other reference to determine whether the signed nonce 126 is still valid as a keep alive may be utilized to prevent continued reuse of the signed nonce. The nonce verification may also include associating and/or determining an association of the signed nonce 126 with the login information or other credentials associated with the user of the trusted device 106 and necessary to facilitate access to the requested media.

The untrusted device 102 may be authenticated using zero sign-on to access the requested media if the signature of the nonce is verified. The corresponding login operation may be performed without requiring the user to enter a username and password or other identifying information, e.g., the untrusted device 102 may be automatically logged in to or otherwise granted access to the requested media without having to identify the user thereof or without having to otherwise identify its ownership or status to the MSO server 104. In this manner, the MSO server 104 may essentially rely upon a trusted relationship between the untrusted device 102 and the trusted device 106 to facilitate access to requested services due to their corresponding proximity on the inside network 108. The tier or level of services being granted to the untrusted device 102 may be commiserate to that associated with the subscriber of the trusted device 106 and/or authorizations previously granted by the user when interacting with the dial home application. The use of the signed nonce 126 or other information provided from the trusted device 106 to the untrusted device 102 may be differentiated from the method described with respect to FIG. 3 at least insofar as utilizing additional information in addition to the IP address to determine trustworthiness. This capability may be beneficial if the inside and/or outside IP addresses are continuously changing as a port or other static address for communication reference may instead be used to identify trusted devices at the same location for the purposes of granting the contemplated zero sign-on authentication.

As supported above, one non-limiting aspect of the present invention relates to a means for providing users access to certain applications, services, etc, based on access via trusted devices without the need for additional user credentials. This may be accomplished using information about the level of trust or level of assurance associated with a device and a distributor, such as a content distributor or service provider, determining whether or not to provide content/service to other devices connecting via the trusted device. One example may include the original CMTS being known to serve a given neighborhood such that when the customer subscribes to receive broadband services, the customer's modem is then associated with a street address as well as associated with a specific CMTS. The cable operator can, therefore, know that the modem street address is within service area of a particular CMTS and a relationship between the cable modem, the CMTS and the street address can be used to identify which cloned modems from a geographical area are being used most frequently with a CMTS, which can also be identified with a geographical area. Optionally, trust may be established by ensuring customer premise wireless router is secured wherein the following trust characteristics of a modem may be analyzed:

1. Correct domain mapping
2. Correct configuration file (CMTS identifies the original configuration file and, therefore can identify when the modem configuration file is changed
3. BPI+Enforce is on (digital certificate) modem MAC address is associated with appropriate digital certificate can limit clones because physical access to the flash memory of the device may be required to clone these types of devices. The CMTS will only talk with modems in BPI+. (BPI+ Enforce is an ECR to the DOCSIS 3.0 Spec).
4. Polling of all CMTSs for duplicate MAC addresses.
5. Modem running the correct software version (SNMP management. MIB exists).
6. Wireless is locked These factors can then be used to create a "Trust Score." If all these factors are met, then the modem can be used for zero sign-on (no need for user name password) for streaming video/audio/gaming). If some factors are deficient, the cable operator can request user name/password and/or provide less service such as lower resolution streaming services, and/or disallow access to some content. This would be done by having the operator have preset values for each of the characteristics of a trusted modem, using those values to create a weighted average and having prearrange agreements with video providers as to what content is associated with what level of trust for the modem. The cable operator can limit the number of zero sign-ons to a limited number of devices per customer so that the customer cannot freely share their purchased services with too many other individuals. The customer may have a limited number of devices to allow zero sign-on so that if a new device came on that would exceed the number of devices allowed the customer would have to remove a device that is currently authorized before supporting zero sign-on with the new device. In some cases, some service may be eliminated from the zero sign-on process, such as but not limited to parental controls, account information, device authorization. Additional trust may also be established when wireless IP devices that are physically attached to the home, such as locks, utility monitoring devices, and large appliances, are secured so as to communicate only through the customer's modem, then the address of all the mobile devices in the home may be trusted as they are communicating through the same modem as the attached devices. These mobile devices may then receive certain services and content that are provided to that home.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of providing zero sign-on authentication comprising:
   receiving, from a gateway associated with a client device, an access request requesting access to a service associated with a service provider;
   identifying an identifying characteristic of the gateway using the access request;
   using the identifying characteristic, determining a level of trust for the gateway; and
   when the level of trust satisfies a threshold level of trust:
      in response to the access request, allowing the client device to access the service; and
      in response to additional access requests, allowing at least one of the client device or additional client devices to access the service when the additional access requests include the identifying characteristic of the gateway.

2. The method of claim 1, wherein the client device accesses the service without providing a username and password combination.

3. The method of claim 1, further comprising, when the level of trust does not satisfy the threshold level of trust, prohibiting the client device from accessing the service.

4. The method of claim 3, further comprising, when the level of trust does not satisfy the threshold level of trust, initiating at least one of a login process or an automatic certificate exchange process to verify a user account associated with the service.

5. The method of claim 1, wherein:
   the threshold level of trust is a first threshold level of trust; and
   the first threshold level of trust corresponds to the gateway satisfying at least one of a set of assessment tests.

6. The method of claim 5, further comprising determining whether the gateway satisfies a second threshold level of trust, the second threshold level of trust higher than the first threshold level of trust and corresponding to the gateway satisfying at least two of the set of assessment tests.

7. The method of claim 6, wherein a second tier of service is accessible by the client device when the second threshold level of trust is satisfied, the second tier of service higher than a baseline level of service accessible when the first threshold level of trust is met.

8. The method of claim 1, wherein:
the client device is a first client device; and
the method further comprises:
receiving a nonce signed by a second client device via signaling transmitted from the first client device through the gateway; and
enabling the second client device to access the service when a signature of the nonce is verified.

9. The method of claim 1, wherein the gateway is at least one of a cable modem configured to support communications over a hybrid fiber-coaxial network or an access point configured to support communications over an electronic network.

10. A non-transitory computer-readable medium having a plurality of instructions executable with a processor to facilitate providing zero sign-on authentication, the plurality of instructions, when executed by the processor, causing the processor to:
receive an access request requesting access to a service associated with a service provider, the access request including an identifying characteristic of a gateway and being transmitted from a client device and through the gateway;
using the identifying characteristic, determine a level of trust for the gateway;
determine whether the level of trust is sufficient for access to the service; and
when the level of trust is sufficient for access to the service, allow the client device to access the service through the gateway.

11. The non-transitory computer-readable medium of claim 10, wherein the plurality of instructions, when executed by the processor, further cause the processor to:
receive an additional access request from an additional client device;
determine whether the additional access request includes the identifying characteristic of the gateway; and
when the additional access request does include the identifying characteristic of the gateway, allow the additional client device to access the service.

12. The non-transitory computer-readable medium of claim 10, wherein:
the client device is a first client device;
the access request is a first access request; and
the plurality of instructions, when executed by the processor, further cause the processor to:
receive a second access request from a second client device;
determine whether the second access request includes the identifying characteristic of the gateway; and
when the second access request includes the identifying characteristic of the gateway, allow the second client device to access the service through the gateway.

13. The non-transitory computer-readable medium of claim 12, wherein the gateway provides network address translation (NAT) for a network such that the first client device and the second client device are each assigned a unique inside address when communicating over the network and an equivalent outside address when communicating outside of the network.

14. The non-transitory computer-readable medium of claim 10, wherein the access request further includes location information for the gateway.

15. The non-transitory computer-readable medium of claim 14, wherein the plurality of instructions, when executed by the processor, further cause the processor to:
compare the location information for the gateway with stored location information included in a user account database; and
determine that the location information with the gateway is consistent with the stored location information.

16. The non-transitory computer-readable medium of claim 10, wherein determining the level of trust for the gateway comprises performing a set of tests, the set of tests including:
a baseline privacy interface plus test;
a matching media access control address and domain name test; and
a simple network management protocol communication test.

17. The non-transitory computer-readable medium of claim 16, wherein:
satisfying at least one of the set of tests results in determining a first tier of service;
satisfying at least two of the set of tests results in determining a second tier of service, the second tier of service higher than the first tier of service; and
satisfying at least three of the set of tests results in determining a third tier of service, the third tier of service higher than the second tier of service.

18. A method for conferring authorizations to access content, the method comprising:
identifying a device requiring an authorization to access the content;
identifying a gateway utilized by the device to request access to the content;
determining that the gateway satisfies a level of trust; and
when the gateway satisfies the level of trust, allowing the device to access the content when the device accesses the content through the gateway.

19. The method of claim 18, further comprising:
identifying an identifying characteristic of the gateway; and
using the identifying characteristic, determining the level of trust for the gateway.

20. The method of claim 18, wherein the device is configured to access the content without providing a username and password combination.

* * * * *